United States Patent [19]

Goodman

[11] Patent Number: 5,494,582
[45] Date of Patent: Feb. 27, 1996

[54] REMOVAL OF SELENIUM FROM WATER BY ION-EXCHANGE

[75] Inventor: Walter H. Goodman, Lisle, Ill.

[73] Assignee: Nalco Chemical Company, Naperville, Ill.

[21] Appl. No.: 396,990

[22] Filed: Mar. 1, 1995

[51] Int. Cl.[6] ............................................. C02F 1/42
[52] U.S. Cl. ........................................ 210/631; 210/683
[58] Field of Search ............................ 210/683, 911, 210/631

[56] References Cited

U.S. PATENT DOCUMENTS

| | | | |
|---|---|---|---|
| 4,206,048 | 6/1980 | Guter | 210/683 |
| 4,405,464 | 9/1983 | Baldwin et al. | 210/724 |
| 4,806,264 | 2/1989 | Murphy | 210/695 |
| 4,915,928 | 4/1990 | Marcantomio | 423/510 |
| 4,940,549 | 7/1990 | Olsen et al. | 210/695 |
| 5,071,568 | 12/1991 | Bennett et al. | 210/754 |
| 5,200,082 | 4/1993 | Olsen et al. | 210/667 |
| 5,322,600 | 6/1994 | Spitz et al. | 204/152 |
| 5,453,201 | 9/1995 | Etzel et al. | 210/683 |

OTHER PUBLICATIONS

Boegel, J. V.; Clifford, D. A.; Selenium Oxidation and Removal by Ion Exchange; EPA Report 600/2-8d6/031, 78 pp. (1986).

Tanaka, H.; Nakayama, M.; Itoh, K.; Sakura, H.; Selective Collection of Selenium (IV) from Environmental Water by Functionalized Ion Exchange Resin; Stud. Environ. Sci., 1984, 23, 365–372.

Ramana, A.; Sengupta, A. K.; Removing Selenium (IV) and Arsenic (V) Oxoaions With Tailored Chelating Polymers; J. Environ. Eng., 1992, 118(5), 755–775.

Primary Examiner—Ivars Cintins
Attorney, Agent, or Firm—Robert A. Miller; James J. Drake

[57] ABSTRACT

Selenium compounds present in aqueous liquids containing sulfate and or chloride anions can be effectively removed by passing the liquid through a thiouronium modified anion ion exchange resin.

3 Claims, No Drawings

REMOVAL OF SELENIUM FROM WATER BY ION-EXCHANGE

Selenium compounds are reported to comprise 0.9 ppm of the earth's crust. While important as a trace mineral in living organisms, selenium is known to be toxic to life in small quantities. Selenium compounds are found naturally in ground waters, and in agricultural runoffs from the use of selenium containing insecticides and herbicides. Recently, environmental and public health concerns have dictated that selenium compounds be removed from industrial water systems prior to their discharge into nature. During the usage of industrial water, say for instance in a cooling tower or boiler, the water is evaporated, concentrating impurities that were found in naturally occurring quantities into higher concentrations. Selenium compounds likewise are present in crude oil and other fossil fuels such as coal. During the processing of these materials, selenium may also be recovered, often in an aqueous system. Selenium compounds found in cooling tower and boiler water blowdowns as well as in aqueous waste waters from the processing of crude oil and other fossil fuels accordingly often contain selenium which has been concentrated over the trace amounts found in nature to amounts which are, or will be prohibited from being discharged into streams, lakes, rivers, and oceans.

Selenium commonly exists in the $-2$, 0, $+4$, and $+6$ oxidation states. In addition, the $+2$ oxidation state is readily accessible in the laboratory. The $-2$ oxidation state most commonly occurs as hydrogen selenide, or in organic selenium compounds. The aqueous chemistry includes both selenite ($SeO_3^{-2}$, selenium $+4$), and selenate ($SeO_4^{-2}$, selenium $+6$). The prior art has suggested the removal of Selenium in two common methods. One, Ferric coprecipitation, involves the addition of a ferric salt, typically ferric chloride or sulfate to the waste water. Adjustment of pH precipitates the iron as ferric hydroxide. Selenite is strongly adsorbed on the ferric hydroxide floc. Selenate is adsorbed less strongly and seems to compete for the same adsorption sites as sulfate as a high sulfate content will inhibit selenate removal. Likewise $Fe_2(SeO_3)_3$ may be precipitated by the addition or formation of a ferric hydroxide floc. Selenite removal strongly depends on the final pH of the solution. The optimal pH value being around 6 with removal decreasing as the pH value increases.

U.S. Pat. No. 5,071,568 removes selenium from aqueous systems by treatment with an oxidizing agent to raise the valence of any selenium present in less than a +4 valence state to Se(IV) followed by treatment with $FeCl_2$ and air. The air serves to oxidize ferrous ions in situ to ferric ions which precipitate as ferric hydroxide. The process is stated to remove at least 50% of selenium in the water. Again, an iron containing sludge is produced. This sludge is voluminous in comparison to the amount of selenium originally present in the water. If the sludge is not further treated to remove selenium, a voluminous amount of a hazardous waste sludge will require disposal.

Chemical reduction/oxidation may also be used to remove selenium compounds from waste water. In this type of process, ferrous ion is typically used. Reduction with ferrous ions most often precedes ferric coprecipitation. In addition, sulfur based reductants such as sulfur dioxide and various metals such as iron and zinc have been used. Some of these reducing agents can reduce selenite and selenate to selenium (0) which forms a colloidal precipitate.

U.S. Pat. No. 4,405,464 discloses the removal of Se(VI) compounds using metallic iron. The iron reduces Se(VI) to a lower oxidation state and then dissolves in the aqueous solution. If the pH is maintained at greater than about 2.3, the patent states that the selenate ions are reduced to at least the Se(IV) oxidation state and the dissolved metallic iron hydrolyzes to form iron hydroxide that precipitates. The precipitated material is separated from the aqueous solution to provide a solution having a reduced selenium ion concentration. If the pH is maintained lower than 2.3, no iron hydroxide is formed, and the patent states that it is believed that at least a portion of the selenium is reduced to the elemental state [Se(0)]. The elemental selenium is then removed from the solution by sedimentation or filtration. This method results in an acidified solution, with less than total selenium removal.

U.S. Pat. Nos. 4,940,549 and 5,200,082 allege nearly 100% selenium removal from agricultural irrigation water. The method involves the concentration of the liquid to about 30% dissolved solids, adjusting pH to an acid pH value, heating to 150° F., treatment with a reducing agent such as powdered iron to lower selenium having a +6 valence to +4 and lower valences. Wettable sulfur is then added to improve the effectiveness of the iron in reducing the selenium in solution. Following total reduction of Se(IV) to lower valence states using the iron/sulfur combination at elevated temperature, the pH is allowed to rise and the mixture is treated with an oxidizing agent. The mixture is then heated to 180° F. with agitation, and the resulting precipitates are removed. Iron may be recycled. While directed to the same problem as the instant invention, the '549 and '082 references involve separate acidification, oxidizing, and reducing steps, in the presence of yet another undesirable material, sulfur.

U.S. Pat. No. 4,806,264 treats an aqueous solution containing selenium ions with a ferrous ion at a pH of about 9. Ferric oxides, containing elemental selenium produced by the reduction of selenium ions is then accomplished. The patent states that elemental selenium may be recovered from the ferric oxides by treatment with strong acids.

U.S. Pat. No. 4,915,928, the disclosure of which is hereinafter incorporated by reference into this specification teaches the use of a strong-base anion exchange resin to remove selenide from refinery waste waters. To effectively utilize this process, sulfide must be stripped from the waste water because as the patentee notes, sulfur competes with selenium, lowering the ability of the resin to remove selenium. While sulfide may be readily stripped from sour water as the patentee suggests, and selenium may then be effectively removed from the waste water using the strong anion-exchange resin, the method described in U.S. Pat. No. 4,915,928 is not effective or practical to remove selenium from biologically treated waste water containing high levels of sulfate. This invention is directed to the discovery of a particularly modified anion ion exchange resin which can be effectively employed for the removal of selenite and selenates from waste waters containing high levels of sulfate anion. Through the use of the particular anion-exchange resin discovered by applicant, waste waters containing selenium and anions which the prior art identifies as competing for the active sites on an anion exchange resin may be effectively treated with anion exchange resins to selectively and effectively remove selenium compounds without the additional steps of removing sulfur or chloride containing materials.

The efficacy of standard strong base and weak base anion exchange resins for selenium removal from biologically treated effluent depends on the specific selenium species present as well as the presence of other competing anions such as sulfate. Selenous ($Se^{IV}$) acid is a weak acid and not completely dissociated to selenite at pH<7. This limits selenite removal using anion exchange resins. Selenate removal can be accomplished at lower pH and with higher capacity on strong base anion exchange resins than selenite removal. See "Selenium Oxidation and Removal by Ion Exchange", Boegel, J. V.; Clifford, D. A.; EPA Report 600/2-86/031, 78 pp. (1986). Standard anion exchange resins possess little selectivity difference between selenite, selenate and selenate. This can limit the capacity of such resins for selenium removal in the presence the much larger (relative to selenium) background of sulfate typical for refinery effluent.

Alternative ion exchange processes include an anion exchange resin loaded with bismuthiol-II ("Selective Collection of Selenium (IV) from Environmental Water by Functionalized Ion Exchange Resin", Tanaka, H., Nakayama, M., Tanaka, T., Itoh, K., Sakuri, H, Stud *Environ. Sci.*, 1984, 23,365–372) and chelating resins loaded with copper, as disclosed in "Removing Selenium (IV) and Arsenic (V) Oxoaions with Tailored Chelating Polymers", Ramana, A., Sengupta, A. K.,*J. Environ. Eng.*, 1992, 118(5), 755–775. The bismuthiol-II provided selenium removal only for about three weeks. Ramana and Sengupta compare several chelating ion exchange resins containing copper for selenium removal. They found that the use of a chelating resin without a fixed charge leads to higher capacity than a chelating resin with a fixed charge. Copper loaded Dow 2N, a picolylamine resin, showed a selectivity of selenite over sulfate of 10. Copper loaded Rohm & Haas IRC-718, containing an iminodiacetate functionality, did not remove selenite in the presence of 250 mg/l sulfate.

The subject invention is directed to the removal of selenite and selenate materials through the use of ion-exchange techniques. Particularly, selenium removal may be accomplished by the use of anion exchange resins containing thiouronium groups. While commercially available ion exchange resins of the type described and claimed herein have been utilized for the recovery of precious metals such as gold or the removal of highly toxic metal ions such as mercury, they are not believed to have been utilized heretofore for the removal of low levels of selenium from waste waters. The use of the ion exchange techniques exemplified and claimed herein provide a novel and effective method for the removal of selenium from industrial and agricultural waste waters.

OBJECT OF THE INVENTION

It is accordingly an object of this invention to provide to the art a novel method for the removal of selenium containing compounds from waste waters containing sulfur and or chloride salts which could be practiced efficiently, yield low volume amounts of waste materials, and which can produce water containing no more than 100 ppb and preferably no more than 50 ppb selenium compounds. It would be a further advance to the art, and a further object of this invention to provide to the art a method for the removal of soluble selenium compounds from waste waters containing sulfate and chloride salts which are generated from agricultural run-off, cooling towers, boilers, refinery waste, chemical processing waste and the like.

THE INVENTION

The basic method of this invention for the removal of soluble selenium compounds from an aqueous liquid comprises passing the waste water containing soluble selenium materials and sulfate and or chloride salts through a thiouronium modified anion exchange resin, and then recovering a waste water containing a reduced level of selenium.

The basic method of this invention involves passing a waste water containing soluble selenium compounds and also containing sulfur and or chloride anions through a thiouronium modified anion exchange resin. The preferred thiouronim modified anion exchange resin is Purolite® S-920 available commercially from the Purolite Company, a division of Bro-Tech Corporation, Bala Cynwyd, Pa. This resin is described by its manufacturer as:

"a macroporous poly-styreninc based chelating resin, with thiouronium groups designed for the selective removal of mercury and for the recovery of precious metals from industrial effluents. The mercury, in particular, is strongly bound to the functional groups to form highly stable complexes, with high selective affinity compared with those of other heavy metals. These properties are largely unaffected by high chloride (or sulphate) content of the effluent. Effluent solutions which may typically contain 2–20 ppm of mercury can be treated to reduce the concentration in solution to less than 0.005 ppm. Purolite S-920 can load up to 150 g of mercury, or gold or 60 g approx. of platinum or palladium for each litre of resin, equivalent to 9.4 and 3.75 lb/ft$^3$ respectively". Typical chemical and physical characteristics of Purolite S-920 are given by the manufacturer as follows:

| Typical Chemical & Physical Characteristics | |
|---|---|
| Polymer Matrix Structure | Macroporous Styrene-divinylbenzene |
| Physical form & Appearance | Opaque Cream Spheres |
| Whole Bead Count | >95% |
| Functional Groups | Thiouronium |
| Ionic Form (as shipped) | H+ |
| Shipping Weight | 740 g/l (46 lb/ft$^3$) |
| Screen Size Range (British Standard Screen) | 14–52 mesh, wet |
| Particle Size range | +1.2 mm<5%, −0.3 mm <1% |
| Moisture Retention, H$^+$ Form | 48–54% |
| Reversible Swelling, (H$^+$ -->Hg$^{++}$) | <5% |
| Specific Gravity, Moist H$^+$ Form | 1.12 |
| Specific Gravity, Moist Hg$^{++}$ Form | 1.40 |
| Total Exchange Capacity, H$^+$ Form (wet, volumetric) | 150 g Hg/l |
| Max, Operating Temperature, H$^+$ Form | 80° (176° F.) |
| Operating pH Range | 1–13 |

In the practice of this invention, waste water containing soluble selenium compounds and sulfate and or chloride anion is passed through a bed of thiouronium modified anion-exchange resin. Generally, waste water is passed through the resin bed at a rate of from 1–5 gallon/minute/ft$^3$. Generally the waste water being treated will have a pH value of from 7–11 and preferably from 7.5–10, although waste water having a pH value outside of this range may be utilized. The suprising feature of this resin, and the process of this invention is its selectivity for selenium, and its deselectivity for sulfate anions which prohibit the use of other known anion exchange resins without first having to remove sulfur compounds from the waste water prior to ion-exchange.

Because of the relatively low levels of selenium contained in waste waters normally found, resin beds of thiouronium modified anion exchange resins last for considerable periods of time. While the resin may be regenerated, it is preferable that the resin be disposed of by landfill, or incineration after its absorption capacity is met.

EXAMPLES

EXAMPLE 1

To test the ability of a standard strong base anion exchange resin to remove selenium from refinery waste water, a sample of biologically treated refinery effluent was passed over a column of IRA-458. Amberlite® IRA-458 is a commercially available strong anion exchange resin available from Rohm and Haas Corporation. IRA-458 is described by its manufacturer to be an acrylic, type I, strongly basic anion exchange resin. The resin initially removed selenium to <25 µg/l from an initial concentration of 300 µg/l. After less than 23 bed volumes processed, corresponding to 4.6 mg of selenium per liter of resin, the selenium had broken through to 87% of the initial. concentration.

EXAMPLE 2

Another test used Purolite S-920, a specialty resin containing thiouronium functional groups, to remove selenium from the same biologically treated refinery effluent, as in Example 1. This resin continued to remove selenium to <25 µg/l even after treating 32 bed volumes.

EXAMPLES 3–5

These test used synthetic solutions to estimate the total capacity of Purolite S-920 for selenite. The three test solutions each contained approximately 600–700 mg/l of selenium and had a solution pH values of 9.5, 7.0, and 4.3. The resin removed a total of 29 g of selenium per liter of resin from the pH 9.5 solution; the resin removed a total of 22 g of selenium per liter of resin from the pH 7.0 solution; and the resin removed a total of 22 g of selenium per liter of resin from the pH 4.3 solution.

EXAMPLES 6–8

These tests used synthetic solutions to estimate the total capacity of Purolite S-920 for selenate. The three test solutions each contained approximately 600–700 mg/l of selenium and had a solution pH values of 9.2, 7.0, and 4.1. The resin removed a total of 30 g of selenium per liter of resin from the pH 9.2 solution; the resin removed a total of 34 g of selenium per liter of resin from the pH 7.0 solution; and the resin removed a total of 31 g of selenium per liter of resin from the pH 4.1 solution.

EXAMPLE 9

This test used a synthetic solution to estimate the total capacity of IRA-458 for selenite. The test solution contained approximately 600 mg/l of selenium and had a solution pH of 7.0. The resin removed a total of 12 g of selenium per liter of resin.

EXAMPLE 10

This test used a synthetic to estimate the total capacity of IRA-458 for selenate. The test solution contained approximately 700 mg/l of selenium and had a solution pH of 7.0. The resin removed 43 g of selenium per liter of resin.

EXAMPLE 11

To test the ability of a standard strong base anion exchange resin to remove selenium from a refinery stripped sour water, a sample of this water was passed over a column of IRA-458. The resin removed selenium to <25 µg/l from an initial concentration of 1200 µg/l even after treating 26 bed volumes.

EXAMPLE 12

Another test used Purolite S-920 to remove selenium from the same refinery stripped sour water. This resin continued to remove selenium to <25 µg/l even after treating 34 bed volumes.

EXAMPLE 13

To test the ability of a standard strong base anion exchange resin to remove selenium from a refinery coker wash water, sample of this water was passed over a column of IRA-458. The resin removed selenium to <25 µg/l from an initial concentration of 1200 µg/l even after treating 36 bed volumes.

EXAMPLE 14

Another test used Purolite S-920 to remove selenium from the same refinery coker wash water. This resin continued to remove selenium to <25 µg/l even after treating 42 bed volumes.

The method of the present invention may be utilized in a variety of fluid systems. While the invention may find its greatest utility in handling cooling system blow-down, the invention may also be used to treat waste streams containing sulfate anions in addition to soluble selenium compounds in the refining, agricultural chemical, and glass industries. The process may also be used to treat production water obtained from the deemulsification of crude oils, coal plant wash waters, mine waste waters, agricultural runoffs, and the like.

It should be understood that various changes and modifications to the presently preferred embodiments described herein will be apparent to those skilled in the art. Such changes and modifications can be made without departing from the spirit and scope of the present invention, and without diminishing its intended advantages. It is therefore intended that such changes and modifications be covered by the appended claims.

Having thus described our invention, I claim:

1. A method for the removal of soluble selenite compounds from an aqueous liquid containing soluble selenite compounds and sulfate anions which comprises passing the aqueous liquid through a bed of a thiouronium modified anion exchange resin.

2. The method of claim 1 wherein the aqueous liquid is biologically treated effluent.

3. The method of claim 1 wherein the aqueous liquid is passed through a bed of said resin at a rate of from 1–5 gallon/minute/cubic foot of resin.

* * * * *